R. E. OLDS.
TRACTOR.
APPLICATION FILED FEB. 7, 1920.

1,368,283.

Patented Feb. 15, 1921.

Inventor
Ransom E. Olds

By [signature]
Attorneys

UNITED STATES PATENT OFFICE.

RANSOM E. OLDS, OF LANSING, MICHIGAN.

TRACTOR.

1,368,283.   Specification of Letters Patent.   Patented Feb. 15, 1921.

Application filed February 7, 1920. Serial No. 356,957.

*To all whom it may concern:*

Be it known that I, RANSOM E. OLDS, a citizen of the United States of America, residing at Lansing, in the county of Ingham and State of Michigan, have invented certain new and useful Improvements in Tractors, of which the following is a specification, reference being had therein to the accompanying drawings.

The invention relates to tractotrs and has particular reference to the construction of the transmission mechanism by which the ground wheels may be driven in either forward or reverse direction and in the same or in the reverse direction from each other. The invention further consists in certain specific features of construction as hereinafter set forth.

Figure 2:
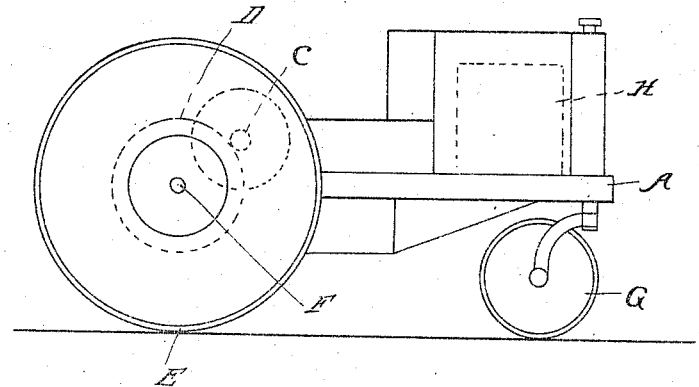
Fig. 2 is a side elevation thereof.
Figure 1:
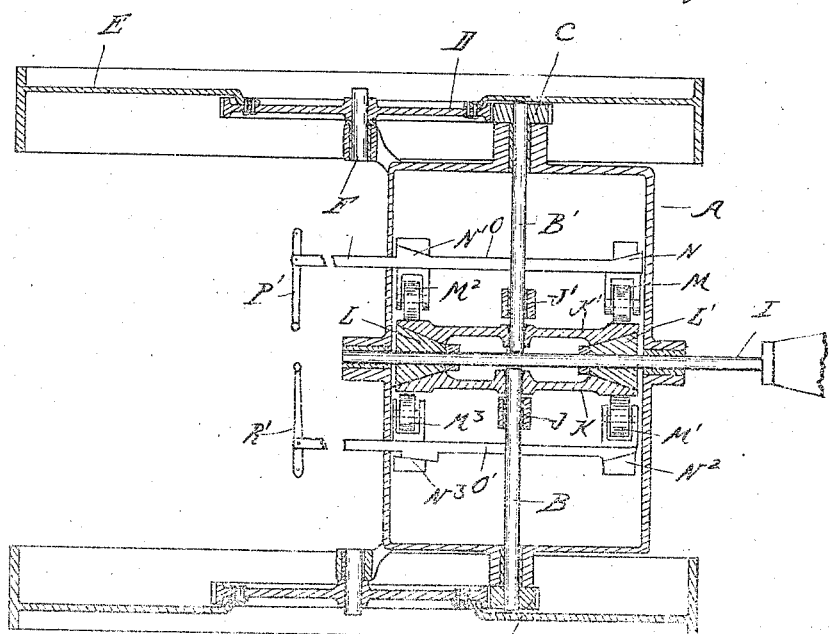
Figure 1 is a sectional plan view of the tractor.

A is the tractor frame, including in its rear portion a housing for the jack-shaft B having at its opposite ends pinions C in mesh with gear wheels D, which drive the tractor wheels E. These tractor wheels are mounted on an axle F which also is connected with the frame A. At the forward end of the frame A is arranged one or more caster wheels G swiveled so as to be capable of changing their direction as necessary for turning or steering. H is the engine mounted on the forward portion of the frame, and I is the rearwardly extending transmission or propeller shaft which passes through the housing containing the jack-shaft.

The jack shaft is formed in two sections B and B' independently revoluble and journaled in bearings J and J'. Adjacent to these bearings there are mounted upon the sections B and B' the beveled friction wheels K and K', said wheels being rotatively fixed with their respective jack shaft sections, but capable of a slight oscillatory movement thereon. L and L' are coöperating beveled friction wheels mounted and rotatively fixed upon the propeller shaft I and arranged on diametrically opposite sides of the friction wheels K and K'. M, M', $M^2$ and $M^3$ are rollers bearing against the outer faces of the friction wheels K and K' and upon diametrically opposite sides thereof. These rollers are mounted for lateral movement upon the frame A and are adapted to be actuated by wedges N, N', $N^2$ and $N^3$ on longitudinally adjustable bars O and O'. The bars O and O' are slidable in bearings and are connected at a suitable point with actuating levers P and R' under the control of the operator and by which the roller bearings M, M', $M^2$ and $M^3$ may be moved laterally with respect to the beveled friction wheels K and K'.

With the construction as described, when the bars O and O' are in the neutral position of adjustment, all of the bars M, M', etc., are so adjusted that the friction wheels K and K' are out of driving engagement with both of the coöperating wheels L and L'. By moving either of the bars O and O' from neutral position in either direction, one of the rollers M, M', etc., will be moved against the adjacent portion of the friction wheel K or K', pressing the same into frictional engagment with one of the driving friction wheels L and L'. At the same time that this frictional engagement is effected, pressure is relieved from the diametrically opposite side of the wheel so that it cannot remain in frictional contact with the other driving friction wheel. Thus it will be understood that where both of the bars O and O' are moved in the same direction and so as to force the rollers M and $M^3$ into contact with the friction wheels K and K', driving engagement is produced between the driving friction wheels L and K, thereby rotating the jack shaft sections B and B', the pinions C and the gear wheels D and driving the tractor wheels in a direction to propel the machine forward. By reversing the movement of the bars O and O', the forward drive is released and the friction wheels K and K' are driven in the reverse direction, causing the backing of the machine. By moving one of the bars, as O, in one direction and the other bar O' in the other direction one of the tractor wheels will be propelled forward and the other reversed, which will cause the turning of the machine, the caster wheels accommodating themselves to this movement. Thus by the simple construction of transmission described I am enabled to drive the machine in both forward and reverse directions and also to accomplish the turning or steering of the machine without the necessity of any other steering mechanism.

What I claim as my invention is:

1. In a tractor, the combination with a pair of tractor wheels, of a pair of alined rotary shafts for driving said wheels, bearings for holding said shafts in alinement, friction wheels non-rotatable and tiltable on said alined shafts, a shaft extending between said friction wheels, a driving friction wheel rotatively fixed upon said shaft adapted for engagement with either of said first-mentioned frictional wheels, and means for pressing either of said first-mentioned friction wheels into engagement with said driving friction to cause transmission of power to the corresponding tractor wheel.

2. In a tractor, the combination with a tractor wheel, of a rotary shaft for driving the same, a friction wheel non-rotatable and tiltable on said shaft, a bearing for said shaft adjacent to said friction wheel, a driving shaft extending transverse to said first-mentioned shaft, friction wheels on said driving shaft for engaging diametrically opposite sides of said first-mentioned friction wheel, and means for pressing said first-mentioned friction wheel into frictional contact with either of said driving friction wheels, whereby said tractor wheel may be driven alternatively in opposite directions.

3. In a tractor, the combination with a pair of tractor wheels, of a pair of alined rotary shafts for driving said tractor wheels, a pair of oppositely facing friction wheels non-rotatably and tiltably secured upon the respective shafts, bearings for said shafts adjacent to said friction wheels, a driving shaft passing transversely between said friction wheels, driving friction wheels upon said shaft arranged for engagement with diametrically opposite sides of said first-mentioned friction wheels, and means for pressing either of said first-mentioned friction wheels into engagement with either of said driving friction wheels, whereby said tractor wheels may be driven forward or reverse and in the same or opposite directions.

4. In a tractor, the combination with tractor wheels, of a jack shaft comprising two alined shaft sections, a driving connection between said shaft sections and the respective tractor wheels, oppositely facing friction wheels non-rotatable and tiltable on said shaft sections, bearings for said shaft sections adjacent to said friction wheels, a driving shaft extending between said friction wheels, driving friction wheels on said driving shaft arranged for engagement with diametrically opposite sides of said first-mentioned friction wheels, and means for pressing either of said first-mentioned friction wheels into driving engagement with either of said driving friction wheels, whereby said tractor wheels may be driven forward or reverse and in the same or opposite directions.

5. A tractor comprising a frame, tractor wheels on which said frame is mounted, a caster wheel for supporting the opposite end of said frame, a jack-shaft comprising alined shaft sections, driving connections between said jack-shaft sections and the respective tractor wheels, oppositely facing friction wheels non-rotatable and tiltable on said jack shaft sections, bearings for said friction shaft sections adjacent to said friction wheels, a driving shaft extending between wheels, driving friction wheels said friction wheels, driving friction wheels mounted on said shaft and arranged to engage diametrically opposite sides of said first-mentioned friction wheels, roller bearings for engaging said first-mentioned friction wheels laterally adjustable to press the same into engagement alternatively with either of said driving friction wheels, wedge bearings for forcing said roller bearings against the adjacent wheels, rods for actuating said wedge bearings, and levers for actuating said rods, whereby the manipulation of said levers will cause the driving of said tractor wheels either forward or reverse and in the same or opposite directions.

6. In a tractor, the combination with a pair of traction wheels and a pair of alined shafts for driving said wheels, of a pair of friction wheels each non-rotatable and tiltable on a wheel shaft, a driving friction wheel between the tiltable wheels and means adapted to tilt the latter into operative engagement with the driving wheel.

7. In a tractor, the combination with a pair of traction wheels and a pair of alined shafts for driving the tractor wheels, of oppositely disposed friction wheels each non-rotatable and tiltable on a driving shaft, a driving friction wheel interposed between the tiltable wheels and means engaging the outer sides of the friction wheels and forcing each into tilted operative engagement with the driving wheel.

8. In a tractor, the combination with a pair of traction wheels and a pair of alined shafts for driving said wheels, of a pair of oppositely disposed friction wheels each non-rotatably secured on a wheel shaft and adapted to tilt thereon into a plane of rotation oblique to that of the shaft, a driving friction wheel between the tiltable friction wheels, and means for tilting each of said friction wheels selectively into operative engagement with the driving wheel.

9. In a tractor, the combination with a pair of traction wheels, a pair of alined shafts for driving said wheels, a driving shaft transversely disposed to and between an alined shaft, a pair of friction wheels non-rotatable and tiltable one on each tractor wheel shaft on opposite sides of the driving shaft, oppositely disposed friction driving wheels on the driving shaft between the tractor shaft friction wheels and means adapted to engage the outer faces of the friction wheels and to move them into tilted operative engagement with the driving wheels selectively.

10. In a tractor, the combination with a pair of oppositely disposed axially alined tractor wheels having a pair of inwardly extending jack shafts, a driving shaft transversely disposed between the jack shafts, a pair of friction wheels between which the driving shaft extends, each non-rotatably and tiltably secured on a jack shaft, a pair of oppositely disposed driving friction wheels on the transverse shaft between the tiltable friction wheels, and means movable transversely to the jack shaft for forcing the tiltable wheels selectively into operative engagement with a driving wheel.

In testimony whereof I affix my signature.

RANSOM E. OLDS.